US008014915B2

(12) United States Patent
Jeon et al.

(10) Patent No.: US 8,014,915 B2
(45) Date of Patent: Sep. 6, 2011

(54) VEHICLE MANAGEMENT SYSTEM AND METHOD USING ECU

(75) Inventors: Jae Wook Jeon, Suwon-si (KR); Sang Won Lee, Suwon-si (KR); Suk Hyun Seo, Suwon-si (KR); Ji Hwan Park, Suwon-si (KR)

(73) Assignee: Sungkyunkwan University Foundation For Corporate Collaboration, Suwon-si, Gyeonggi-do (KR)

( * ) Notice: Subject to any disclaimer, the term of this patent is extended or adjusted under 35 U.S.C. 154(b) by 1240 days.

(21) Appl. No.: 11/675,061

(22) Filed: Feb. 14, 2007

(65) Prior Publication Data

US 2008/0037504 A1 Feb. 14, 2008

(30) Foreign Application Priority Data

Jun. 21, 2006 (KR) .................. 10-2006-0055872

(51) Int. Cl.
*G01M 17/00* (2006.01)
(52) U.S. Cl. .......... 701/29; 701/33; 701/36; 455/556.1; 455/557
(58) Field of Classification Search ............. 340/425.5, 340/426.14, 426.16, 426.28; 701/33, 36, 701/44, 45, 29; 455/569.2, 556.1, 557
See application file for complete search history.

(56) References Cited

U.S. PATENT DOCUMENTS

| 6,853,894 | B1 * | 2/2005 | Kolls | 701/29 |
| 7,590,768 | B2 * | 9/2009 | Gormley | 710/8 |
| 2005/0065779 | A1 * | 3/2005 | Odinak | 704/201 |

FOREIGN PATENT DOCUMENTS

| KR | 1020010056293 A | 7/2001 |
| KR | 2002-25545 | 4/2002 |
| KR | 2003-0060585 A | 7/2003 |
| KR | 2006-32824 | 4/2006 |

OTHER PUBLICATIONS

Office Action for corresponding Korean application No. 10-2007-0049117, Apr. 22, 2008, 8 pages.
MPC5554 Microcontroller Product Brief, Freescale Semiconductor, Rev. 2.2, Feb. 2006, 10 pages.

* cited by examiner

*Primary Examiner* — Temica M Beamer
(74) *Attorney, Agent, or Firm* — Blakely, Sokoloff, Taylor & Zafman LLP

(57) ABSTRACT

Disclosed is a vehicle management system using a wireless network system the system comprising, a WCDMA service unit having a specified ID and obtaining access to a network wirelessly, an ECU system associated with the WCDMA service module for controlling all kinds of interfaces in a vehicle, a service provider for providing various services when the WCDMA service module is connected to the wireless network, and a user having the services through non-wireless or wireless communication inside or outside of the vehicle.

10 Claims, 3 Drawing Sheets

VEHICLE MANAGEMENT SYSTEM AND METHOD USING ECU

CROSS-REFERENCE TO RELATED APPLICATION

The present application claims, under 35 U.S.C. §119(a), the benefit of the filing date of Korean Patent Application. No. 10-2006-0055872 filed on Jun. 21, 2006, the entire contents of which are hereby incorporated by reference.

BACKGROUND OF THE INVENTION

1. Field of the Invention

The present invention relates to a system for providing a vehicle ID service using an Electric Control Unit (hereinafter, referred to as ECU), and more particularly to a system for providing a vehicle ID service using an ECU, in which a Wideband Code Division Multiple Access (hereinafter, referred to as WCDMA) service module is mounted on the ECU and a serial number is provided for the WCDMA as like a portable terminal, thereby making it possible to provide additional services using the serial number.

2. Description of the Prior Art

In our complex modern society, the time which drivers spend in vehicles per day in increasing more and more. While driving, drivers want to perform various tasks and obtain necessary information.

Further, while driving their vehicles, drivers want to use a vehicle navigation service, such as traffic information and directions to a destination, and various multimedia services such as listening to music CDs and watching AV functions of video and TV.

Recently, technologies relating to an information terminal for a vehicle, an AV system and a navigation system for a vehicle have been developed in order to satisfy drivers' various demands.

As high-performance computers have been becoming rapidly popular recently, demands for processing multimedia data have increased. Further, as the capability of a processors and wireless network access speed are improving, it is expected that common tasks between vehicle drivers or between a vehicle driver and a physical distribution center can be implemented.

In addition, the use of a subminiature wireless-multimedia input/output terminal capable of performing Internet Access to transmit and receive voice and images increases in order for drivers to be present in handling cooperation tasks.

A system according to the International Standard prescribing communication between multimedia terminals is required, which has a compact sire and a small consumption of electricity, can secure a stability in transmission of data in a wireless mobile environment and sufficient data compression in order to transmit digital images and audio data in real-time, can provide convenience for users during driving, and can be compatible with another system.

Such a wireless multimedia terminal system for a vehicle is disclosed in Korean Laid-open Patent Publication No. 10-2001-56293.

The wireless multimedia terminal system disclosed in the Laid-open Patent Publication No. 10-2001-56233 includes a driver interface unit 100, a multimedia data processor 120, a call control and data transmission unit 130, multitask supporting unit 140 and a communication accessing unit 150, as shown in FIG. 1.

The driver interface unit 100 includes a driver interface module 101 for displaying data so that a user can use traffic information, playing the role of starting arid finishing image communication and managing entire interfaces in a system, a driver information management module 102 for selecting and calling a user's menu designated to a remote driver or a physical distribution manager who wants to carry out image communication, and a vehicle information management module 103 for processing and displaying information required in managing and driving a vehicle.

The multimedia data processor 120 includes a voice recognition module 121 which does not require unnecessary key operation for a driver's safety during driving, a video capture/output and video stream driver module 122 for receiving and digitalizing moving picture signals to compress a video stream, and an audio input/output and audio stream driver module 123 for receiving and digitally compressing a driver's voice and for recovering and outputting an audio stream received from a driver.

The call control and data transmission unit 130 includes a call setting module 131 for allowing a vehicle driver to transmit images to a remote site and for setting a call in order for the driver to comply with an invitation to image communication from the remote site, a signal control module 132 for performing the exchange of the performance relating to multimedia data processing between a moving terminal system and a terminal system for a remote vehicle system after the call setting is completed and for performing a function, for example, setting of wireless data transmission channel, and a real-time wireless transmission module 133 for transmitting packets of multimedia stream data and synchronized information of a vehicle terminal in driving and for unpacking packet data received from the other terminal system driving vehicle so as to extract stream data according to media.

The multi-task supporting module 140 provides a multi-task function to application programs under an operating system in the vehicle terminal system, creates transmission and reception tasks for independent video and audio stream data, simultaneously carries out multiple-tasks in real-time, responds to a finishing requirement from a terminal system of another vehicle while a driver uses an image communication function of the terminal system of the driver's vehicle, and continuously performs functions of setting and controlling a call.

The communication connecting unit 150 includes a wireless modem driver module 151 for configuring a wireless modem environment so that the driver performs the image communication under a wireless environment of the driving vehicle, a wired modem driver module 152 for supporting a wired modem access function and operating an image communication function on the Internet, and ECU for storing and displaying vehicle traffic information.

The wireless multimedia terminal system according to the above-mentioned Laid-open Patent Publication No. 10-2001-56293 supplies a wireless multimedia environment to a user who drives a vehicle, and also can operate as a vehicle terminal system which is a multimedia input/output terminal mounted on a vehicles to implement an image communication function based on the International Standard relating to a multimedia terminal for image communication.

However, since the wireless multimedia terminal system according to the Laid-open Patent Publication No. 10-2001-56293 is separately controlled without relation to an ECU system, it is difficult to freely control a vehicle from outside of the vehicle.

SUMMARY OF THE INVENTION

Accordingly, the present invention has been made to solve the above-mentioned problems occurring in the prior art, and it is an object of the present invention to provide a vehicle ID service system, which has a WCDMA service module mounted on an ECU system and provides a general network service and a specified service adapted to a vehicle using an ECU system when the WCDMA service module gains access to a network, and which can be associated with a portable terminal so that a user can have access to the vehicle through the portable terminal from outside in real-time.

In order to achieve the above object of the present invention, there is provided a vehicle management system using a wireless network system, which includes: a WCDMA service unit having a specified ID and obtaining access to a network wirelessly; an ECU system associated with the WCDMA service module for controlling all kinds of interfaces in a vehicle; a service provider for providing various services when the WCDMA service module is connected to the wireless network; and a user having the services through non-wireless or wireless communication inside or outside of the vehicle.

In order to achieve the above object of the present invention, there is provided a vehicle management system using a wireless network system, which includes: a WCDMA service module installed in a vehicle, having a specified ID, and obtaining access to a network wirelessly; an ECU system associated with the WCDMA service module, interfacing various devices, sensors and units in the vehicle, controlling and obtaining information from the devices, sensors and units according to a user's instructions; a service provider for storing vehicle information received from the ECU system through the WCDMA service module and providing various kinds of services to the vehicle according to a user's demand; a vehicle information database connected to the service provider for storing vehicle information received from the ECU system; and a content database connected to the service provider for storing contents to be provided for a vehicle user, wherein the vehicle management system obtains access to the wireless network through the WCDMA service module and provides vehicle information from the ECU system to the service provider according to a user's instructions, and wherein the service provider provides a necessary service to the corresponding vehicle automatically or according to a user's demand based on the vehicle information, so that the ECU system controls the devices, sensors and units using the service received from the service provider.

According to the embodiment of the present invention, the user controls the vehicle through the WCDMA service module using a wireless terminal. Further, according to the present invention, the user sets a necessary service in advance based on the vehicle information and provides the service provider with the preset service, and the service provider provides the corresponding vehicle with the preset service when the units of the corresponding vehicle are turned on.

The ECU system includes at least a 32 bit microcontroller unit.

According to the present invention, the WCDMA service module includes: a WCDMA communication unit used for obtaining access to the network wirelessly in a WCDMA communication way; and a gateway for connecting the WCDMA communication module to the ECU system so that the WCDMA communication module communicates with the ECU system.

The gateway includes a CAN network communication protocol supporting module for connecting the WCDMA service module to the ECU system supporting a CAN network communication protocol.

Further, the gateway includes a MOST network communication protocol supporting module for connecting the WCDMA service module to the ECU system supporting a MOST network communication protocol.

The ECU system comprises a CAN communication unit for analyzing the CAN network communication protocol.

The ECU system comprises a MOST communication unit for analyzing the MOST network communication protocol.

In order to achieve the above object of the present invention, there is provided a vehicle management method using a wireless network system, which includes the steps of: connecting a WCDMA service module to an ECU unit so that the WCDMA service module communicates with the ECU unit; obtaining access to a network wirelessly using the WCDMA service module; and connecting a vehicle management system to a service provider using the WCDMA service module so as to have a service from the service provider.

In order to achieve the above object of the present invention, there is provided a vehicle management method using a wireless network system, which includes the steps of; connecting a WCDMA service module, which is installed in a vehicle and has a specified ID, to an ECU unit so that the service module communicates with the ECU unit; Obtaining access to a network wirelessly through the WCDMA service module; controlling various devices, sensors and units of the vehicle and providing a service provider through the WCDMA service module with information on the devices, sensors and units; storing vehicle information, received from the ECU unit through the WCDMA service module, in a vehicle information database; providing the corresponding vehicle with necessary services by a service provider based on corresponding vehicle information stored in the vehicle information database and content information stored in the content database; and controlling the devices, sensors and units of the vehicle by means of the ECU unit based on the services received from the service provider.

BRIEF DESCRIPTION OF THE DRAWINGS

The above objects, other features and advantages of the present invention will become more apparent after a reading of the following detailed description when taken in conjunction with the drawings, in which.

DETAILED DESCRIPTION OF THE PREFERRED EMBODIMENTS

Figure 1:
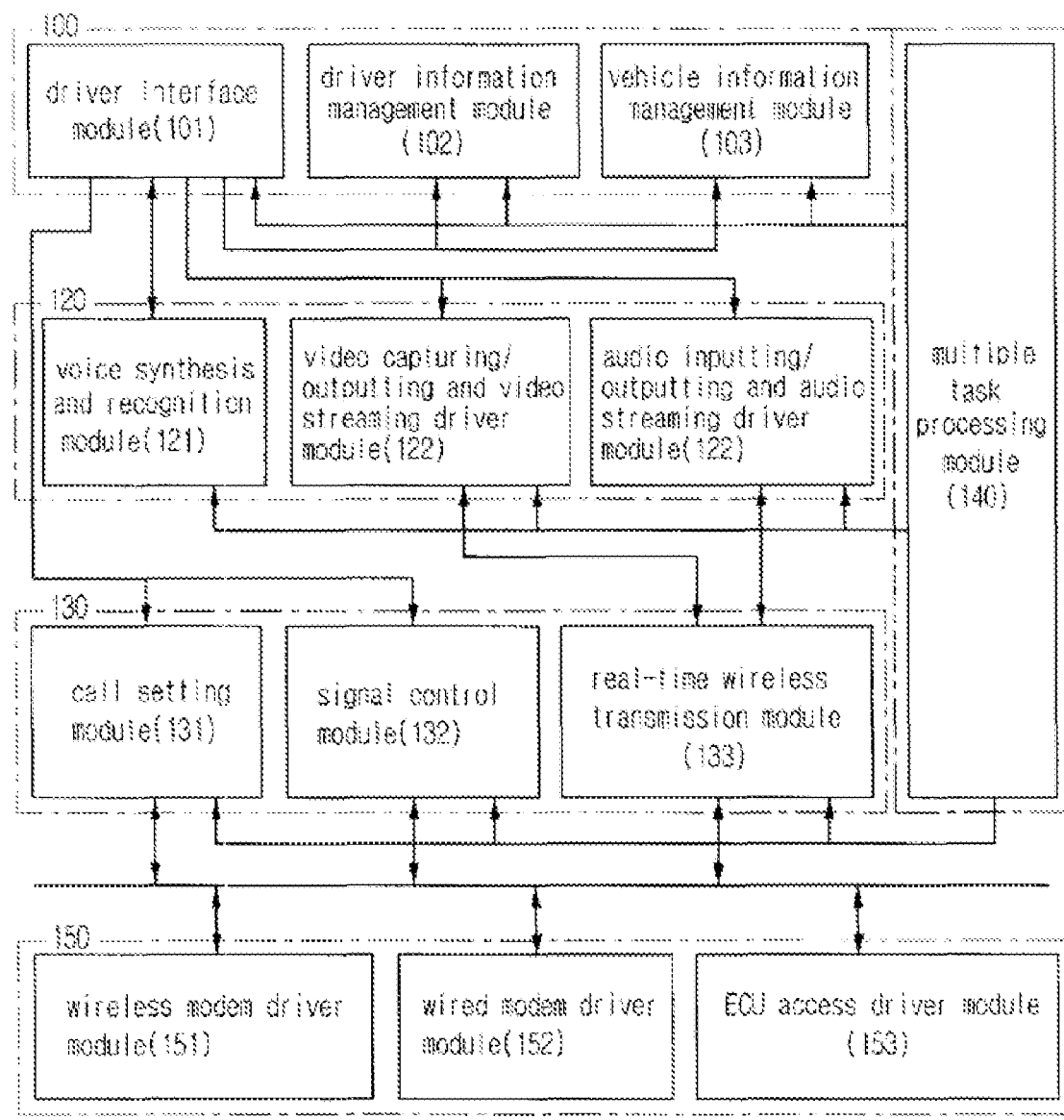
FIG. 1 is a block diagram illustrating a conventional wireless multimedia terminal system for a vehicle.

Hereinafter, the preferred embodiments of the hinge assemblies and the mobile devices according to the present invention will be described with reference to the accompanying drawings.

A WCDMA module can transmit information on general voice and multimedia data more rapidly in comparison with a CDMA module. Therefore, it is possible to provide a vehicle management agency with lots of information on various devices connected to a vehicle using an advantage of the WCDMA module, so that a user can have a vehicle checkup service and other high quality services from the vehicle management agency.

First, MOST communication is a protocol invented for connecting multimedia devices to the vehicle. Therefore, a camera module, an infrared sensor used for measuring a short distance, and a radar module used for measuring a long distance, etc. can be connected to the vehicle. Information from such multimedia devices can be identified through a digital display device in the vehicle. A service agency can provide various services to a user using such information as follows. First, assuming that a driver is not at the location of the vehicle, this means that the vehicle is parked at a certain place. At the time when the driver wants to wirelessly know about the peripheral environment around the location in which the vehicle is parked, the service agency can transmit image information of a camera through an Internet web server to the driver. This allows the driver to identify and monitor the peripheral circumstances around the parked vehicle from a remote site.

Second, the WCDMA module allows streaming of the various multimedia contents to an audio device and a display device in the vehicle, thereby expanding entertainment data holding limitation infinitely.

Third, when the vehicle breaks down or operates abnormally while driving, GPS information and error information of the vehicle input through a CAN communication unit are transmitted to a service provider. The service provider transmits information on emergency measures which a driver performs to the display unit of the vehicle, based on the received information, and also transmits information to a nearby auto repair shop. Further, in a case where an unskilled driver has difficulty to perform emergency measures for the vehicle, the service provider can directly transmit a vehicle control signal to the CAN communication unit so as to stop the vehicle safely according to predefined emergency measure instructions.

Furthermore, the benefits obtained by enduing the vehicle with ID are following. Since only one ID is endued to a vehicle, it is possible to remote-control the vehicle even when the Internet cannot be used. Specifically, a driver can directly call the vehicle through a general telephone line or contact the vehicle by way of the service provider as a repeater, so as to obtain simple information. For example, since vehicle controlling devices are connected to one another through the CAN network, various information can be identified from the vehicle information management module in the vehicle at the remote site. Specifically, the driver identifies in advance lots of information on the amount of oil, the engine status, the brake status, etc. and additionally asks the service provider to repair the vehicle when the vehicle has some trouble.

Hereinafter, the preferred embodiment of the present invention will be described in detail with reference to the accompanying drawings.

Figure 2:
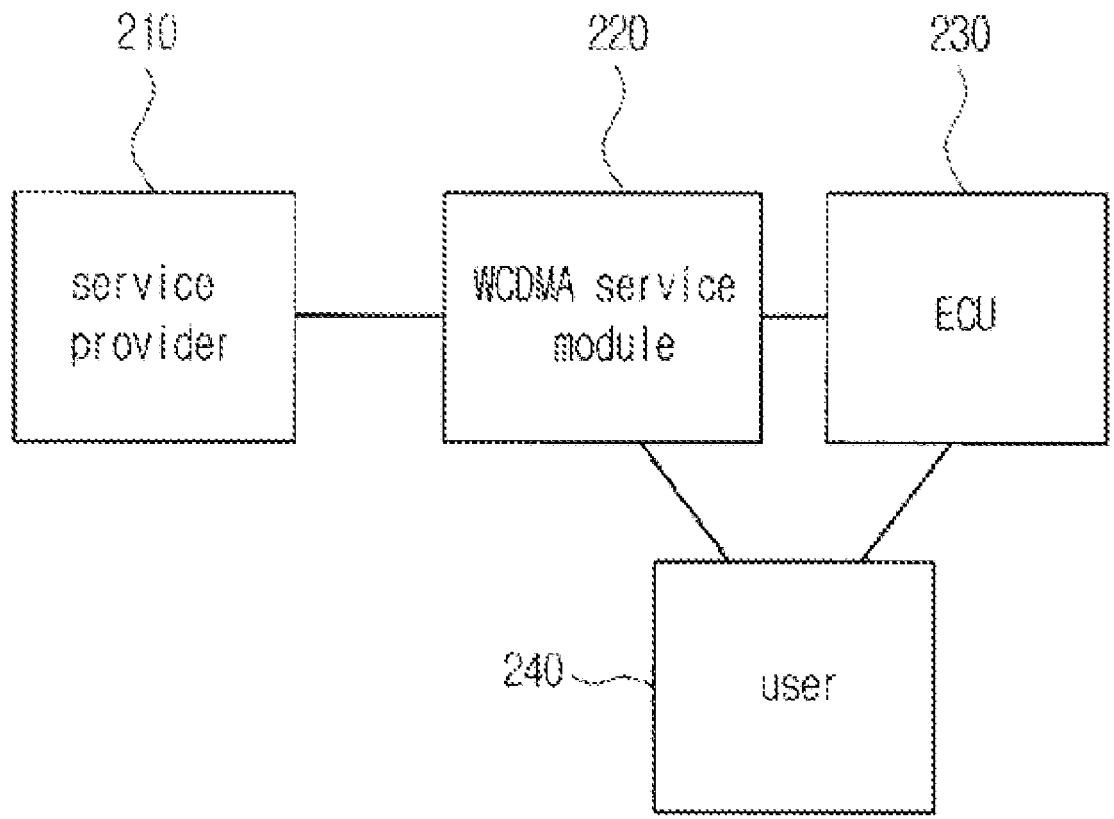
FIG. 2 is a block diagram showing a system for providing a vehicle ID service using an ECU according to the present invention.
Figure 3:
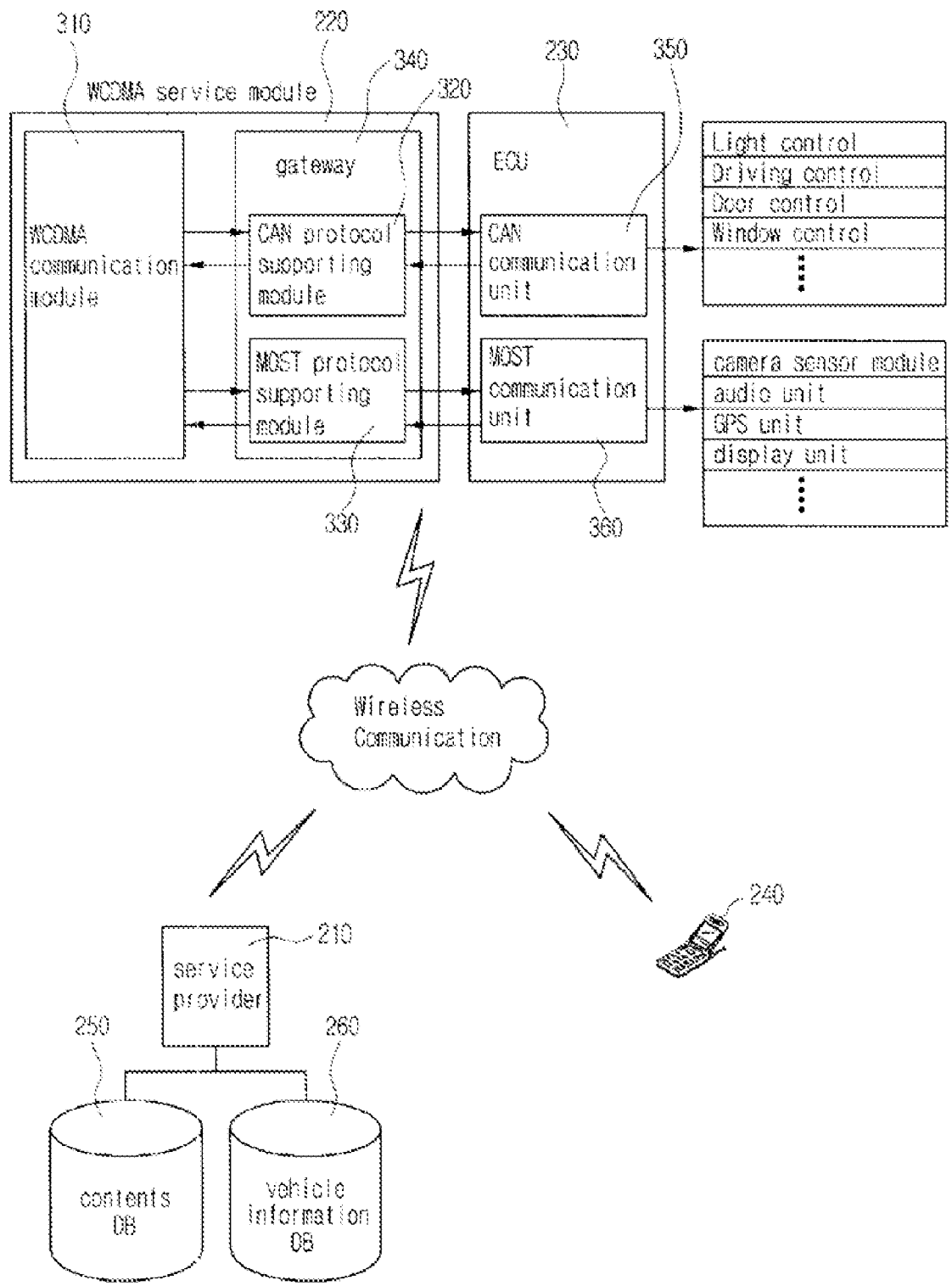
FIG. 3 is a block diagram illustrating a communication system between a WCDMA service module and an ECU system according to the present invention.

FIG. 2 is a block diagram illustrating a vehicle ID service system using an ECU according to the present invention, and FIG. 3 is a block diagram illustrating the communication between a WCDMA service module and an ECU system according to the present invention.

As shown in FIGS. 2 and 3, the vehicle ID service system using the ECU according to the embodiment of the present invention includes the WCDMA service module 220 having a certain ID and connected to the network wirelessly, the ECU system 230 associated with the WCDMA service module 220 for controlling different interfaces in the vehicle, and a service provider 210 for providing specified services suitable to the vehicle when the WCDMA service module 220 is connected to the wireless network. The service provider 210 has a vehicle information database 260 storing vehicle information received from the ECU system 230 and a content database storing contents to be provided to a user for the vehicle.

Alternatively, the vehicle ID service system may include a wireless terminal which allows a user to control the vehicle through the WCDMA service module at a remote site.

A Micro Controller Unit (MCU) 5554, commercially available from FreeScale, Co., is used as the ECU system 230 applied to the present invention.

The MPC 5354 is a 32 bit microcontroller. The ECU system 230 consisting of the MPC 5554 can control all components of the vehicle.

Further, the ECU system 230 includes a Control Area Network (CAN) 350 and a Media Oriented System Transport (MOST) 360 analyzing CAN network communication protocol and MOST communication protocol, respectively, which are input through the WCDMA service module 220.

Furthermore, the ECU system 230 includes a flexray communication unit (not shown) analyzing FlexRay network communication protocol which has processing a capability ten times greater than the CAN and MOST network communication protocols. An MFR 4200 MCU, commercially available from the FreeScale, Co., is used as the FlexRay communication unit.

The WCDMA service module 220 includes a WCDMA communication module 310 used for obtaining access to a wireless network using a WCDMA communication scheme, and a gateway 340 for associating the WCDMA communication module 310 with the ECU system 230.

The gateway 340 includes a CAN network communication protocol supporting module 320 for connecting the WCDMA service module 220 to the ECU system supporting the CAN network communication protocol and a MOST network communication protocol supporting module 330 for connecting the WCDMA service module 220 to the ECU system 230 supporting the MOST network communication protocol.

The gateway 340 is disclosed in Korean Laid-open Patent Publication No. 10-2003-60585, which transmits a control message received from the CAN communication unit 350 to the MOST communication unit 360 and transmits a control message received from the MOST communication unit 360 to the CAN communication unit 350, using a control circuit (not shown) embedded in the gateway 340.

Specifically, the gateway 340 converts data received from the CAN communication unit 350 into data for the MOST communication unit 360 and also converts data received from the MOST communication unit 350 to the CAD communication unit 350, so that the CAN communication unit 350 and the MOST communication unit 360 coordinate with each other.

Therefore, wireless communication devices for implementing a communication environment with various multimedia devices, for examples, a camera sensor module, an audio unit, a GPS unit, a display unit, etc., may be connected to the MOST communication unit 360. Since the wireless communication devices, which are connected to the MOST communication unit 360 to implement the communication environment with the various multimedia devices, may share data of different devices connected to the CAN communication unit 350, the MOST communication unit 360 and the CAN communication unit 350 are coordinated and controlled.

Various units of a body system are connected to the CAN communication unit 350 in order to control the vehicle, and for example include an Assist Door Module (ADM), a Driver Door Module (DDM), a Tire Pressure Monitoring System (TPMS), an air-conditioner, a trip computer, a lamp control module, a driving control module, a window control module, etc.

Lots of control information on units for the driver's safety and convenience, i.e. an engine, a transmission, an Anti-Lock Break System (ABS), a door control unit, a roof control unit, an electromotive seat, a climate sensor, a room lamp, power windows, an audio unit, a video unit, a navigation system, etc., are transmitted to the ECU system 230 through the CAN network communication protocol.

The MOST communication unit 360 includes a unit for Human Machine Interface (HMI) such as a TV, a CDC player and a DVD player for multimedia, a tuner unit such as a touch screen through which a user can input data while viewing an LCD and an audio unit, a monitor for a rear seat, a navigation unit, a power amplifier, etc.

The MOST network communication protocol can transmit images and voice data at higher velocity, compared with the CAN network communication protocol.

Although data for control can be transmitted by using the MOST network communication protocol, the MOST network communication protocol is generally applied to the multimedia system of the vehicle for an audio unit, a video unit, a DVD player, a Digital Audio Broadcasting (DAB) unit, a mobile phone, a navigation system, the Internet, etc.

Since the MOST network communication protocol and the CM network communication protocol are known in the related user art, the description thereof will be omitted.

When the WCDMA service module 220 is linked to the ECU system 230 and a specified ID as like the phone number of a mobile phone is endued to the WCDMA service module 220 in order to identify different vehicles, the ECU system 230 can obtain access to the wireless network through the WCDMA communication module 310.

As having a real-time operating system, the ECU 230 collects information on the vehicle in real-time and provides data to the service provider 210.

Since the WCDMA service module 220 is associated with the ECU system 230, it is possible to control the vehicle. Accordingly, the user can use a general network service and the specified service suitable for the vehicle using the ECU system 230.

Further, the WCDMA communication module 220 can perform wireless communication using the mobile communication network, and has a WCDMA communication module 310 embedded therein in order to use the mobile communication network.

In addition, the WCDMA service module 220 periodically transmits vehicle information to the service provider through the mobile communication network. Such vehicle information is stored in the vehicle information database 260 of the service provider 210. When the user or driver requires necessary information, the service provider 210 transmits real-time traffic information and all finds of vehicle information through a wireless communication antenna to the ECU unit 230, based on vehicle information stored in the vehicle information database 260. The service provider 210 transmits the information from the content database 250 connected to the service provider 210 to the ECU unit 230.

The WCDMA service module 220 receives GPS information from a GPS satellite (not shown) through a GPS antenna (not shown).

The ECU system 230 receives lots of vehicle information from various sensors seen as a velocity sensor, a steering sensor, and a wheel sensor, etc. and a camera mounted on the vehicle, and transmits the received vehicle information to the WCDMA service module 220.

The WCDMA service module 220 transmits input vehicle information, the GPS information received through the GPS antenna, and the data required by the user through the WCDMA communication module 310 to the service provider 210.

When the ECU system obtains access to the network through the WCDMA communication module 210, the service provider 210 provides various kinds of additional services relating to the vehicle through the network to the ECU system.

After receiving various information of the vehicle, the GPS information, and the data required by the user through the WCDMA communication module 310, the service provider 210 searches for the optimal route to the destination of the driving vehicle based on the received information, and processes and transmits the information back to the user who required it.

Then, the WCDMA service module 220 reads map data received from the service provider 210 so as to display the received GPS information on a display unit (not shown), thereby assisting the user in navigating the vehicle and obtaining necessary information.

The WCDMA service module 220 can collect status information of the driving vehicle, for example, total mileage, current velocity, current location, status of engine oil, status of tires, the amount of the fuel, time to exchange brake oil, etc. in the vehicle.

These functions are carried out through CAN, MOST, or FlexRay communication by using various sensors and a processor mounted on the vehicle in the ECU system 230.

Further, the ECU system 230 controls all structural elements in order to smoothly carry out the multimedia functions of the vehicle such as a navigation function, an AV function, a wireless communication function, etc. required to drive the vehicle.

Herein, the service provider 210 providing services to the vehicle individually obtains access to a vehicle with an individual ID so as to obtain the status information of the vehicle, and provides various services to the user based on the status information of the vehicle.

For example, the service provider provides informative messages of the amount of fuel, time to supply oil for the vehicle, total mileage, date when the engine oil is changed, a ad due date when the engine oil will he changed, and also provides various multimedia contents.

When the user obtains the WCDMA service module 220 using the terminal 240, only pay load data is transmitted from the terminal to the WCDMA service module 220 through the FlexRay network communication protocol.

The FlexRay communication protocol supports a transmission rate of a maximum of 10 Megabits/second.

The communication between the WCDMA service module 220 and the FlexRay network communication protocol is carried out in such a manner that the WCDMA system module 220 receives a large amount of messages in a receiving buffer (not shown) of a receiver thereof and transmits the messages by unit of byte depending on the FlexRay network communication protocol scheme.

In addition, a data frame ID can be endued to the payload data.

Generally, when the user obtains access to the WCDMA service module 220 using the terminal 240, the frame ID is set to '1' and this access may generate data by the combination of button signals of 0, 1, 2, 3, 4, 5, 6, 7, 8, 9, #, and *.

Further, when the service provider 210 obtains access to the WCDMA service module 220 through the wireless Internet, more various instructions can be endued to the WCDMA service module 220. At this time, when accessing the WCDMA service module 220 through the wireless Internet, ID is set to '2'.

Therefore, data may be distinguished from one another according to the access method.

Then, the WCDMA service module 220 receives the distinguished data, extracts and transmits only the pay-load data to the ECU system 230 in a manner of the FlexRay network communication protocol.

The data transmitted through the FlexRay network communication protocol performs the control operation in the ECU system 230.

Thus, the vehicle driver can have a navigation service including the optimal route relating to the intermediate point and the destination of the vehicle and traffic information, etc. through the WCDMA communication module 310 and the WCDMA service module 220 with an embedded GPS antenna, based on information received from the service provider 210, even if a separate navigation system is not installed in the vehicle.

In addition, the driver may view video and TV programs through the display unit using the information from the service provider 210 and have an AV service including music CDs through an audio device, even though a separate AV system is not mounted in the vehicle.

Since the WCDMA service module 220 and the ECU system 230 can be rightly associated with the terminal 240, the user has access to the vehicle from outside of the vehicle in real-time using the terminal 240.

Of coarse, a security system is required when the user obtains access to the vehicle from a remote site using the terminal 240.

In this case, a specific system must be prepared for user certification.

Otherwise, an unqualified user has access to the vehicle without certification.

When a certification procedure is finished, the driver in the remote site can identify various kinds of information stored in the vehicle.

Furthermore, the user can control the vehicle so as to start driving the vehicle, operate the air conditioner, or turn on/off emergency lamps.

In addition, the user can find the vehicle through the GPS service using the ID endued to the WCDMA service module 220.

Further, since the vehicle can be remotely controlled by using the portable terminal, the user can obtain access to the WCDMA service module 220 using the ID endued to the vehicle so as to enable the ECU system 230 to stop the operation of the engine or to interrupt the driving of the vehicle even when the vehicle is stolen. Accordingly, the use of a stolen vehicle can be prevented.

However, when the driving vehicle stops its operation, suddenly, it may cause a car accident. The ECU system monitors the velocity of the vehicle continuously and forcibly stops the operation of the engine when the velocity of the vehicle is 0 kms/h.

Meanwhile, the user can obtain access to the WCDMA service module through the service provider 210 using the internet in order to identify various kinds of information stored in the vehicle. In addition, the user can obtain access the vehicle directly through mobile communication service providers which have identification numbers of 010, 011, 016, and 019, etc., respectively.

The present invention can provide various kinds of additional services for the vehicle using the WCDMA service module with a specified number, which are similar to mobile communication services. Further, the present invention may obtain, access to and control the WCDMA service module, to which a specified number is endued, using a wired telephone instead of the specified terminal as though a user calls a mobile phone using a non-wireless telephone.

While a preferred embodiment of the present invention has been described for illustrative purposes, those skilled in the art will appreciate that various modifications, additions and substitutions are possible, without departing from the scope and spirit of the invention as disclosed in the accompanying claims.

What is claimed:

1. A vehicle management system using a wireless network system, the system comprising:
    a wideband code division multiple access (WCDMA) service module installed in a vehicle, having a specified ID, and obtaining access to a network wirelessly;
    an electric control unit (ECU) system associated with the WCDMA service module, interfacing various devices, sensors and units in the vehicle, controlling and obtaining information from the devices, sensors and units according to a user's instructions;
    a service provider for storing vehicle information received from the ECU system through the WCDMA service module and providing various kinds of services to the vehicle according to a user's demands;
    a vehicle information database connected to the service provider for storing vehicle information received from the ECU system; and
    a content database connected to the service provider for storing contents to be provided for a vehicle user,
    wherein the vehicle management system obtains access to the wireless network through the WCDMA service module and provides vehicle information from the ECU system to the service provider according to a user's instructions, and wherein the service provider provides a necessary services to the corresponding vehicle automatically or according to a user's demands based on the vehicle information, so that the ECU system controls the devices, sensors and units using the service received from the service provider.

2. The vehicle management system as claimed in claim 1, wherein the user controls the vehicle through the WCDMA service module using the wireless terminal.

3. The vehicle management system as claimed in claim 1, wherein the user sets a necessary service in advance based on the vehicle information and provides the service provider with the preset service, and the service provider provides the corresponding vehicle with the preset service when the units of the corresponding vehicle are turned on.

4. The vehicle management system as claimed in claim 1, wherein the WCDMA service module comprises:
    a WCDMA communication unit used for obtaining access to the network wirelessly in a WCDMA communication way; and a gateway for connecting the WCDMA communication module to the ECU system so that the WCDMA communication module communicates with the ECU system.

5. The vehicle management system as claimed in claim 4, wherein the gateway comprises a controller area network (CAN) network communication protocol supporting module for connecting the WCDMA service module to the ECU system supporting a CAN network communication protocol and a media oriented system transport (MOST) network communication protocol supporting module for connecting the WCDMA service module to the ECU system supporting a MOST network communication protocol.

6. The vehicle management system as claimed in claim 5, wherein the ECU system comprises a CAN communication unit for analyzing the CAN network communication protocol.

7. The vehicle management system as claimed in claim 5, wherein the ECU system comprises a MOST communication unit for analyzing the MOST network communication protocol.

8. A vehicle management method using a wireless network system, the method comprising:

connecting a wideband code division multiple access (WCDMA) service module, which is installed in a vehicle and has a specified ID, to an electric control unit (ECU) unit so that the WCDMA service module communicates with the ECU unit;

obtaining access to a network wirelessly through the WCDMA service module;

controlling various devices, sensors and units of the vehicle and providing a service provider through the WCDMA service module with information on the devices, sensors and units;

storing vehicle information, received from the ECU unit through the WCDMA service module, in a vehicle information database;

providing the corresponding vehicle with necessary services by a service provider based on corresponding vehicle information stored in the vehicle information database and content information stored in the content database; and controlling the devices, sensors and units of the vehicle by means of the ECU unit based on the services received from the service provider.

9. The vehicle management method as claimed in claim 8, comprising the step in which a user controls the vehicle through the WCDMA service module using the wireless terminal.

10. The vehicle management method as claimed in claim 8, comprising the step in which the user sets a necessary service in advance based on the vehicle information and provides the service provider with the preset service, and the service provider provides the corresponding vehicle with the preset service when the units of the corresponding vehicle are turned on.

* * * * *